(12) United States Patent
Karame et al.

(10) Patent No.: US 11,170,371 B2
(45) Date of Patent: Nov. 9, 2021

(54) METHOD FOR MANAGING DATA IN A NETWORK OF NODES

(71) Applicant: NEC Laboratories Europe GmbH, Heidelberg (DE)

(72) Inventors: Ghassan Karame, Heidelberg (DE); Wenting Li, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 587 days.

(21) Appl. No.: 16/081,035

(22) PCT Filed: Mar. 3, 2016

(86) PCT No.: PCT/EP2016/054597
§ 371 (c)(1),
(2) Date: Aug. 30, 2018

(87) PCT Pub. No.: WO2017/148527
PCT Pub. Date: Sep. 8, 2017

(65) Prior Publication Data
US 2019/0019183 A1    Jan. 17, 2019

(51) Int. Cl.
*H04L 9/06* (2006.01)
*G06Q 20/40* (2012.01)
*G06Q 20/38* (2012.01)
*G06Q 30/00* (2012.01)
*G06Q 10/08* (2012.01)
*H04L 9/00* (2006.01)
*H04L 9/30* (2006.01)

(52) U.S. Cl.
CPC ..... *G06Q 20/3829* (2013.01); *G06Q 10/0833* (2013.01); *G06Q 20/401* (2013.01);
(Continued)

(58) Field of Classification Search
CPC .......... G06Q 20/3829; G06Q 30/0185; G06Q 10/0833; G06Q 20/401; G06Q 50/28;
(Continued)

(56) References Cited

U.S. PATENT DOCUMENTS 9,875,510 B1 * 1/2018 Kasper .................. H04L 67/104
2002/0042662 A1 * 4/2002 Tsukishima ........ G06Q 10/0875
700/95
(Continued)

FOREIGN PATENT DOCUMENTS

WO    WO-2017027648 A1 *  2/2017  ............. H04L 63/12

OTHER PUBLICATIONS

Florian Tschorsch, "Bitcoin and Beyond: A Technical Survey on Decentralized Digital Currencies", IEEE, Mar. 2, 2016 (Year: 2016).*

(Continued)

*Primary Examiner* — Neha Patel
*Assistant Examiner* — Duan Zhang
(74) *Attorney, Agent, or Firm* — Leydig, Voit & Mayer, Ltd.

(57) ABSTRACT

A method for managing data in a decentralized blockchain consensus network of nodes interrelated with each other according to a tree-like structure includes publishing, by a root node, a product contract description for a new product, the product contract description including at least product information and product state information. The method further includes generating, by the root node, at least one product item for the new product by publishing a product item contract including at least item identification information, the product contract for the item, item state information, and valid modifier information for information of at least one node to be able to modify the item state. The method also includes updating, by the root node upon generating a new item for a product, the product contract description by including item information into the product contract description.

16 Claims, 5 Drawing Sheets

(52) U.S. Cl.
CPC ......... *G06Q 30/0185* (2013.01); *H04L 9/008* (2013.01); *H04L 9/0637* (2013.01); *H04L 9/30* (2013.01)

(58) Field of Classification Search
CPC ...... G06Q 40/04; G06Q 10/087; H04L 9/008; H04L 9/0637; H04L 9/30; H04L 63/0428; H04W 4/021; G06F 17/30575; G06F 17/30958; G06K 7/1413; G06K 7/10366
See application file for complete search history.

(56) References Cited

U.S. PATENT DOCUMENTS

| | | | |
|---|---|---|---|
| 2013/0197976 A1* | 8/2013 | Mahakian | G06Q 10/08 705/7.38 |
| 2016/0098723 A1* | 4/2016 | Feeney | G06Q 20/065 705/75 |
| 2016/0269182 A1* | 9/2016 | Sriram | H04L 9/3242 |
| 2017/0032237 A1* | 2/2017 | Kuniavsky | G06K 19/06028 |
| 2017/0116693 A1* | 4/2017 | Rae | H04L 9/3236 |
| 2017/0178072 A1* | 6/2017 | Poornachandran | H04L 9/3236 |
| 2019/0260585 A1* | 8/2019 | Kawai | H04L 9/002 |

OTHER PUBLICATIONS

Khan Rasib et al.: "Modeling a secure supply chain integrity preservation system", 2013 IEEE International Conference on Technologies for Homeland Security (HST), IEEE, Nov. 12, 2013 (Nov. 12, 2013), pp. 741-747, XP032550135.

* cited by examiner

METHOD FOR MANAGING DATA IN A NETWORK OF NODES

CROSS REFERENCE TO RELATED APPLICATIONS

This application is a U.S. National Stage Application under 35 U.S.C. § 371 of International Application No. PCT/EP2016/054597 filed on Mar. 3, 2016. The International Application was published in English on Sep. 8, 2017 as WO 2017/148527 A1 under PCT Article 21(2).

FIELD

The present invention relates to a method for managing data in a network of nodes. The present invention further relates to a network comprising a plurality of nodes. Even further the present invention relates to a non-transitory computer readable medium storing a program causing a computer to execute a method for managing data in a network of nodes.

BACKGROUND

In order to increase the user experience of smart devices and to defeat product counterfeit, many companies are motivated to provide a public or dedicated query platform for their partners or their customers for information inquiry over certain product information. For example, by joining partnership with platforms pharmaceutical companies allow consumers or others in the supply chain to verify the genuineness of the medicine by sending SMS to the platform. Some customers or partners can not only trace the life cycle of a product, but also update the status of the product with granted permission.

However, by exposing public query application programming interfaces API to the partners and customers, such platforms bear the risks of outside attacks to their internal data management system, thus causing data corruption. Moreover, even with granted permission for data modification, some data cannot be changed arbitrarily, but needs to follow some predefined rules, e.g. product lifecycle. For example, a drug that is flagged "consumed" cannot switch its status to "not consumed", but only to "recalled". Such logic is usually complicated for the users to verify automatically (e.g., they need to synchronize with the product manufacturer about the pre-defined rules).

Moreover, such conventional platforms are also required to be highly available and scalable in order to handle huge amounts of requests from partners or users in a global scale. Though conventional solutions of a distributed database that ensures data consistency exists, such a conventional system is not suitable for a dynamic and open environment, i.e., these conventional solutions are bound to a small group of trusted nodes.

Finally, it is also hard to detect counterfeit products in the supply chain network, as the partners are not willing to share their databases for privacy reasons. Conventional methods as disclosed in the non-patent literature of D. Zanetti, L. Fellmann and S. Capkun, "Privacy-preserving clone detection for RFID-enabled supply chain," in IEEE RFID, 2010 or in the non-patent literature of D. Zanetti, S. Capkun and A. Juels, "Tailing RFID Tags for Clone Detection," in NDSS, 2013 tend to use multi-party computation or tailing RFID memory with random values in order to detect counterfeit products with different product flows.

SUMMARY

In an embodiment, the present invention provides a method for managing data in a network of nodes, wherein the network is a decentralized blockchain consensus network, and wherein the nodes of the network are interrelated with each other according to a tree-like structure. The method includes publishing, by a root node, a product contract description for a new product, the product contract description including at least product information and product state information. The method further includes generating, by the root node, at least one product item for the new product by publishing a product item contract including at least item identification information, the product contract for the item, item state information, and valid modifier information for information of at least one node to be able to modify the item state. The method also includes updating, by the root node upon generating a new item for a product, the product contract description by including item information into the product contract description. The publishing of the product contract description and the product item contract description is performed by sending transactions into the network. The transactions are verifiable by the nodes in the network, the transactions each refer to a contract account, and upon verification of a transaction by at least one node, the verified transaction is added to the blockchain with its address.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
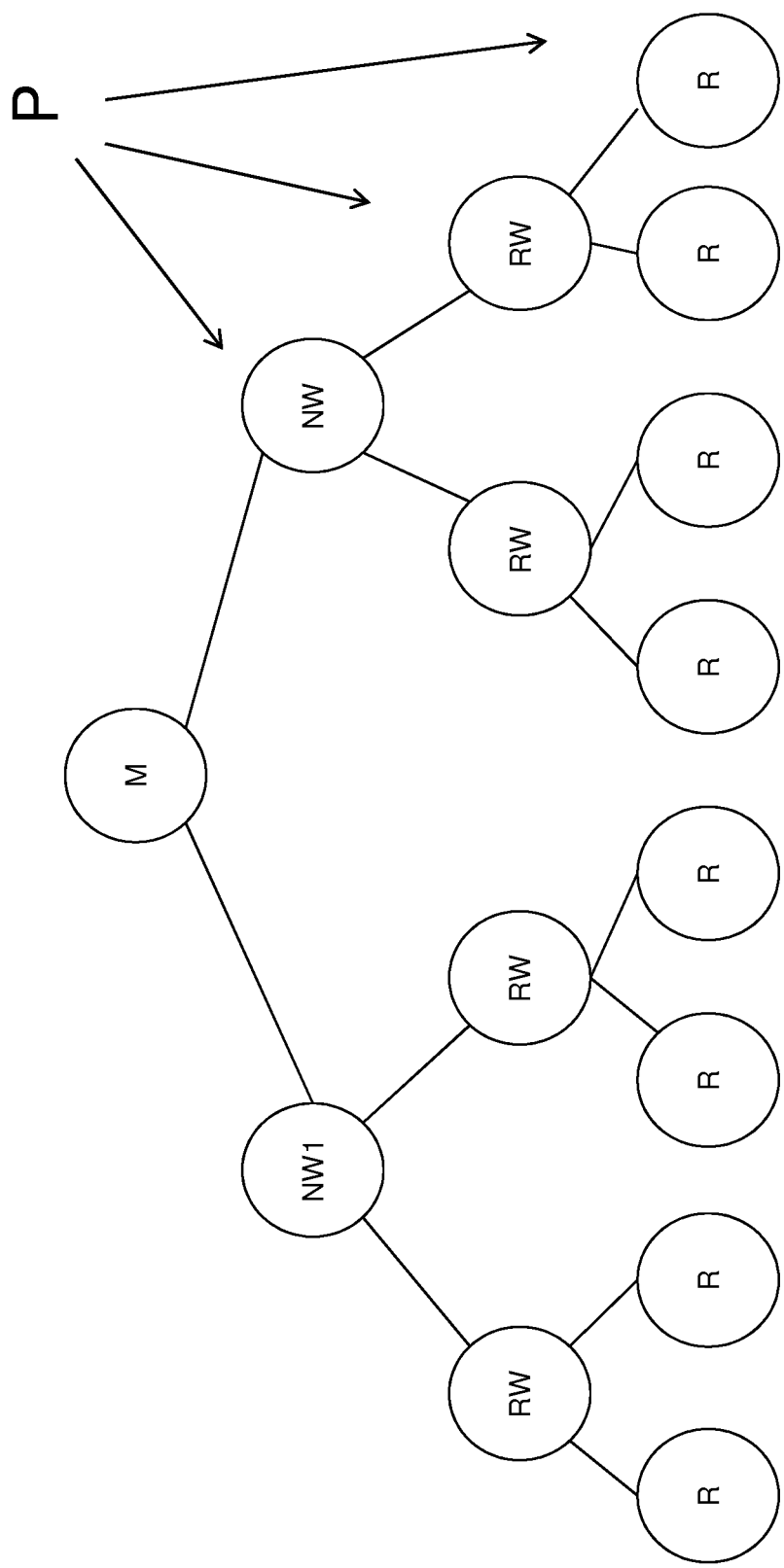
FIG. 1 shows a part of a method according to an embodiment of the present invention.

Although applicable in general to any kind of data, the present invention will be described with regard to data of or associated with manufactured products. Although applicable in any kind of field, the present invention will be described with regard to the field of supply chain management.

One of the problems of conventional systems, e.g. supply chains is, there are different parties collaboratively managing the status of the goods with enforced validation rules. They do usually not trust each other, yet they want to reach consensus on the product information in order to detect counterfeit products. In addition conventional systems are not scalable and expose any internal database of the partners at least to a certain extent.

Embodiments of the present invention enable a supply chain system to be scalable and robust against data corruption in the database. Embodiments of the present invention also provide a high level of security, in particular to detect counterfeit products. Furthermore, embodiments of the present invention provide an enhanced flexibility and an easy implementation.

In an embodiment, the present invention provides a method for managing data in a network of nodes, wherein said network is a decentralized blockchain consensus network, wherein said nodes of said network are interrelated with each other according to a tree-like structure, wherein the root node publishes a product contract description for a new product, said product contract description includes at least product information and product state information, and wherein said root node generates at least one product item for said new product by publishing a product item contract including at least item identification information, the product contract for said item, item state information and valid modifier information for information of at least one node to be able to modify the item state, wherein upon generating a new item for a product said root node updates the product contract description by including item information into said product contract description and wherein said publishing of said product contract description and said product item contract description is performed by sending transactions into said network, wherein said transactions are verifiable by the nodes in the network, said transactions each refer to a contract account, and wherein upon verification of a transaction by at least one node a verified transaction is added to the blockchain with its address.

In a further embodiment, the present invention provides a network comprising a plurality of nodes, wherein said network is a decentralized blockchain consensus network, wherein said nodes of said network are interrelated with each according to a tree-like structure, wherein the root node publishes a product contract description for a new product, said product contract description includes at least product information and product state information, and wherein said root node is adapted to generate at least one product item for said new product by publishing a product item contract description including at least an item identification information, the product contract for said item, item state information and valid modifier information for information of at least one node to be able to modify the item state, wherein upon creating a new item for a product said root node is adapted to update the product contract description by including item information into said product contract description and wherein said publishing of said product contract description and said product item contract description is performed by sending transactions into said network, wherein said transactions each refer to a contract account, and wherein upon verification of a transaction by at least on node a verified transaction is added to the blockchain with its address.

In a further embodiment, the present invention provides a non-transitory computer readable medium storing a program causing a computer to execute a method for managing data in a network of nodes, wherein said nodes of said network are interrelated with each other according to a tree-like structure, wherein the root node publishes a product contract description for a new product, said product contract description includes at least product information and product state information, and wherein said root node generates at least one product item for said new product by publishing a product item contract including at least item identification information, the product contract for said item, item state information and valid modifier information for information of at least one node to be able to modify the item state, wherein upon generating a new item for a product said root node updates the product contract description by including item information into said product contract description and wherein said publishing of said product contract description and said product item contract description is performed by sending transactions into said network, wherein said transactions are verifiable by the nodes in the network, said transactions each refer to a contract account, and wherein upon verification of a transaction by at least one node a verified transaction is added to the blockchain with its address.

The terms "node", "partner", "client", etc. refer in particular in the claims, preferably in the specification each to a device or devices adapted to perform computing like a personal computer, a tablet, a mobile phone, a server, a router, a switch or the like and comprise one or more processors having one or more cores and may be connectable to a memory for storing an application which is adapted to perform corresponding steps of one or more of the embodiments of the present invention. Any application may be software based and/or hardware based installed in the memory on which the processor(s) can work on. The devices or entities may be adapted in such a way that the corresponding steps to be computed are performed in an optimized way. For instance different steps may be performed in parallel with a single processor on different of its cores. Further the devices or entities may be identical forming a single computing device. The devices or entities may also be instantiated as a virtual device running on a physical computing resource. Different devices may therefore be executed on said one physical computing resource.

The term "computer readable medium" may refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM, EEPROM or the like.

The term "product" refers in particular in the specification, preferably in the claims to one or more physical objects which can be manufactured like computers, television sets, tables, chairs, windows, etc. or biological or chemical substances like drugs, pills, powder, oil, gasoline, cells, etc. In general any kind of physical object, which can be manufactured or generated or computed can be seen as a "product".

The term "decentralized blockchain consensus network" is to be understood in the most general sense and refers in particular in the claims, preferably in the specification to a network having a plurality of nodes providing decentralized storage among said participating nodes in the network. Each node has preferably a copy either a light version or a full version of the chain of blocks, wherein each block may be a closed ledger to agree universally on the data status.

The term "transaction" is to be understood in the most general sense and refers in particular in the claims, preferably in the specification to information sent or transmitted into the network, e.g. to nodes connected to the node sending said transaction. Said transaction may be provided in form of a message, a data packet or the like and may comprise information for the recipients of said transaction.

The term "interrelated" in connection with "nodes" is to be understood in the most general sense and refers in particular in the claims, preferably in the specification to any physical and/or unphysical relation between two or more nodes. For instance two nodes are connected with each other via internet (physical relation) and one of them represents a manufacturer of a product and the other represents a buyer of a product (non-physical relation).

The term "description" means in particular the claims, preferably in the specification, information or data, e.g. a data structure comprising data and/or functions organized in attributes or the like.

The term "item information" refers in particular in the claims, preferably in the specification, to information or data describing or being associated with an item.

The term "valid modifier information" refers in the claims, preferably in the specification, to information or data allowing to identify the node(s) which is(are) entitled to modify, amend and/or change a state of an item.

The term "state" in connection with a product or item refers in the claims, preferably in the specification, to information or data of a product or item describing a mode or state of an item according to one or more parameters associated with an item, e.g. item is sold, received or the like.

At least one embodiment may have at least one of the following advantages:
Robustness because distributed copies of the data prevent a single point of failure or attack
Blockchain consensus network ensures consistency of the data across all nodes by information broadcasting, transaction, validation and blockmining
Enables interim detection of counterfeiting in the blockchain
Scalability
No need to trust a single partner enables detection of misbehavior in the network
Enhanced privacy since privacy of partners is respected
Enhanced efficiency since search procedures in history for verification of a state transition are not necessary.

Further features, further embodiments and further advantages are described or may become apparent in the following:

Said address of said root node may be a public key of said root node. This allows to define the account address of a manufacturer being registered in the blockchain network. The product contract and the item contract are then verifiable by all partners represented by the nodes.

Said product state information may be generated or updated such that the product state is determined according to one or more valid state transition rules. This allows in an easy but reliable way to enable a change of the product state.

Said valid state transition rules may be implemented as a key-value map indicating a state as key and one or more valid states to which said state can be changed as values for said key. This enables an easy implementation of valid product state transition rules.

Said item identification information may be based on a unique, unpredictable number, being chosen upon creation of said item. This enables to enhance the security since the item identification information is based on a unique unpredictable number but said unique unpredictable number, like a serial number is never sent to the blockchain network and so an adversary cannot create a counterfeit with a valid item identification by just observing the communication in the network since the number is unpredictable.

Said item identification information may be computed as the hash value of said chosen serial number. This does not reveal any information about the unique number and the hash value can be easily computed.

To validate a product item a node may broadcast a transaction in the network comprising product item identification information and product contract description for said product item and nodes in the network may verify such transaction by computing item identification information and querying the product contract description. This allows an easy implementation of a consensus and address based blockchain network.

One of the valid states for an item may be a terminated state and when a product item has the terminated state, the product item contract is removed from the blockchain. This enables for example to save storage costs: For example when the lifecycle of an item comes to an end only the terminated state is left in the blockchain. When the product item state changes to the terminated state it informs the product item contract and removes the product item contract from the blockchain, so it can no longer be invoked.

A central verification authority may provide verification for the nodes upon request and may register and verify users of the node. This enables accountability while preserving user privacy as long as the partners, i.e. the nodes, do not misbehave. The identity for a verification authority then provides verification service to the partners. The central verification authority may also accept a request to acknowledge a new account from the verified partners and announce it to the blockchain network by sending a corresponding transaction into the blockchain network. The central verification authority may verify a signature of a partner, when a partner creates a new account and submits the account to the central verification authority. The central verification authority or identity verification authority can for example create a contract to acknowledge the accounts in which the data is a list of acknowledged accounts and the function that add a new account to the list if the sender of such transaction is the central verification authority itself. Further the identity verification authority may verify the identity of partners and store the root certificate of partners as the identity information locally. Even further the central verification authority may provide transaction validation: When nodes receive a new transaction they will additionally resort to the contract of the central verification authority to see if the sender account is acknowledged. Otherwise the transaction is not valid and will be discarded.

Consensus within said network may be achieved using a proof-of-stake, wherein the stake is defined as the number of product items associated with a certain account. The Proof-of-Stake can be used to achieve consensus in the network. The voting power of each node for a new block is decided by his stake. The stake is defined as a number of product items that a certain account holds. Each time when the partners update the state of a product item and change the valid modifier from his account to another account, the first account may also transfer a virtual coin to the other account. Thus, the other account holds the virtual stake which is equivalent to the number of product items it holds at the moment for example.

The product item contract may accumulate cryptographically a plurality of product items. This enhances the security: Without accumulation product information remains public and therefore a rival is able to know the number of products the manufacturer has produced. This enables to hide the number of products each account or partner is dealing with and may reduce the number of transactions in the network.

The number of cryptographically accumulated product items may be encrypted using homomorphic encryption and the encryption key is the public key of a receiving node. This enables a recipient to prove that the stake is greater than some pre-defined threshold stake. Further no reaction and no communication among these nodes is required and thus security is enhanced and an easy implementation is enabled.

For providing said proof-of-stake, blocks in the blockchain may be bonded for finalization, wherein said finalization may be based on a supermajority of validating nodes, wherein for bonding a zero-knowledge proof by the validating nodes may be computed such that their stakes are within a certain range. This enables to achieve consensus in network using the proof of stake and to verify the stake during a proof of stake block validation using the zero-knowledge proofs over their encrypted number of accumulated items.

There are several ways how to design and further develop the teaching of the present invention in an advantageous way. To this end it is to be referred to the patent claims subordinate to the independent claims on the one hand and to the following explanation of further embodiments of the invention by way of example, illustrated by the figure on the other hand. In connection with the explanation of the further embodiments of the invention by the aid of the figure, generally further embodiments and further developments of the teaching will be explained.

FIG. 1 shows a part of a method according to an embodiment of the present invention. In FIG. 1 an example of a supply chain partnership is illustrated with a manufacturer M, a national wholesaler NW, a regional wholesaler RW and a retailer R. Each of them is a partner in the decentralized blockchaining network. The nature of a supply chain is here the tree-like organizing structure. Here the supply chain partnership may or may not be pre-defined. In the following it is assumed that partners P only know their direct business partners P, partners P may continuously join and leave the supply chain and each product item is equipped with a unique serial-number for identification, i.e. item ID. Partners P may also acquire the item ID when shipping or receiving the items, for examples by scanning the RFID equipped together with the product ID. Each of the manufacturer, national wholesaler, regional wholesaler and retailer is a partner in this supply chain and is represented by a node in peer-to-peer blockchain network as shown in FIG. 2.

Figure 2:
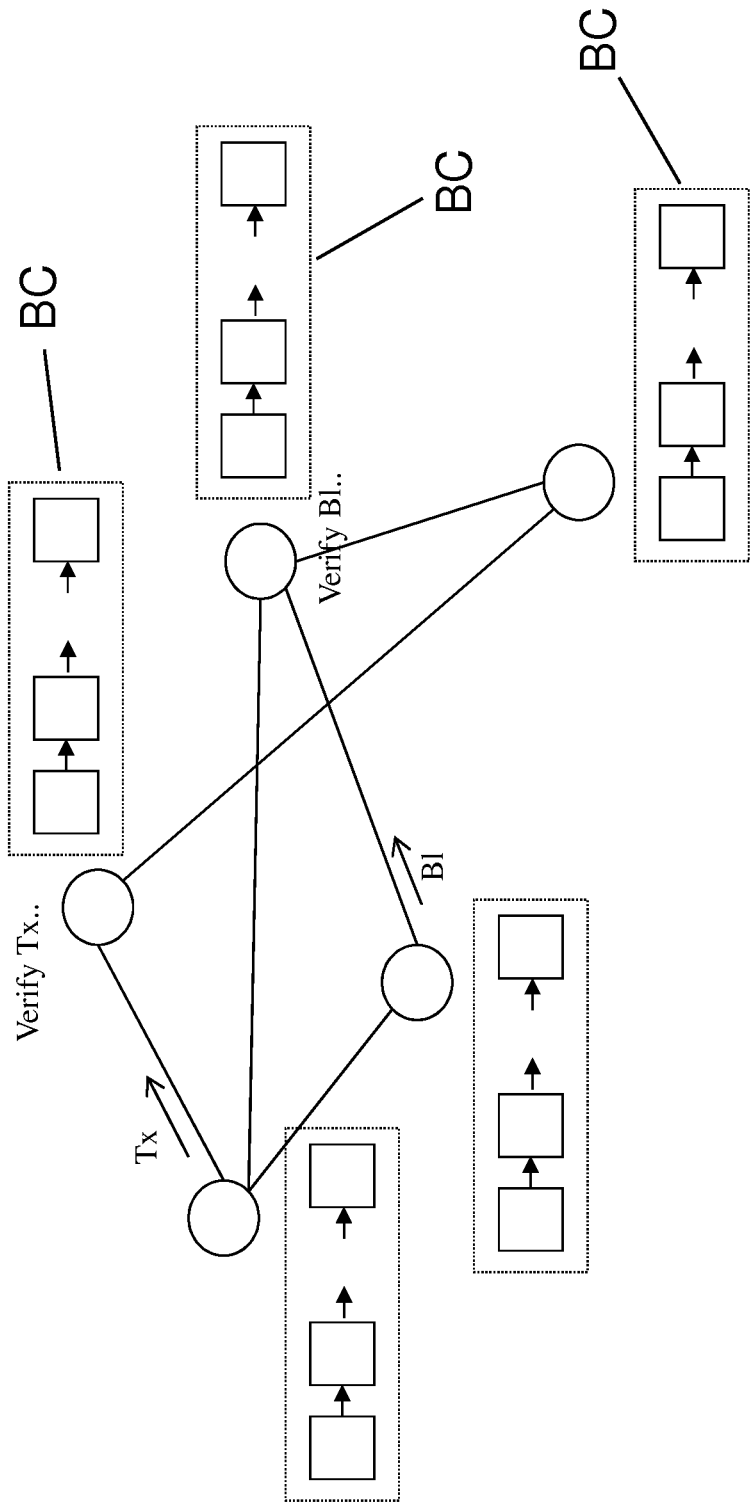
FIG. 2 shows a part of a system according to an embodiment of the present invention.

FIG. 2 shows a part of a system according to an embodiment of the present invention. In FIG. 2 the application of a blockchain network to supply chain partnership is shown. Each partner in the blockchain network is a node and has a broadcasted copy of the blockchain. The nodes broadcast transactions Tx and blocks B1 in the network where the nodes will all verify the transactions and the blocks. A validated transaction will be included in an ongoing block. A validated block will be included in the local block chain. If the decentralized blockchain consensus network is based on an Ethereum block chain nodes also broadcast contracts which will be included in the blocks. A transaction transmitted into the network invokes the application programming interface API of a contract and then will be executed by a so-called Ethereum Virtual Machine on the validation nodes, i.e. the other nodes, for transaction validation.

Figure 3:
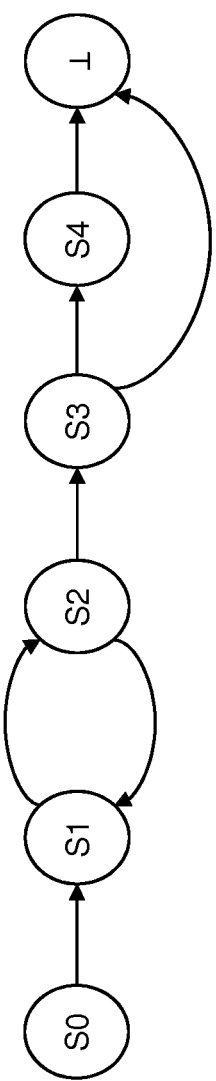
FIG. 3 shows a part of a method according to an embodiment of the present invention.

FIG. 3 shows a part of a method according to further embodiment of the present invention. FIG. 3 shows an example of product lifecycle and a state description as well as an example of product state transition. The basis for FIG. 3 is the following: The manufacturer M can define the lifecycle of a product as a final state machine FSM graph so that the update of a product status has to conform to the FSM transition rules. The FSM is here embedded in the blockchain, so that the transaction, i.e. a message to update the product item status, for which a validation process is performed will lookup the FSM and verify if the state transition is valid or not.

In more detail the following states for a product are defined: S0: produced, S1: sent, S2: received, S3: sold, S4: recalled and $\perp$: disposed/terminated. For example the product state transition graph shows the following: When a product is produced (state S0) the product is then shipped for example to a national wholesaler NW then the state of the product is changed to being shipped (state S1) and the national wholesaler NW acknowledges the reception of the product such that the state of the product is set to "received" (state S2). The national wholesaler NW then sales the product to a regional wholesaler RW, so then the product status is set to "sold" (state S3). If the product has been used then the product status is disposed or terminated (state $\perp$) or if the product has an error, then the product is recalled by the regional wholesaler, so that the product status set to "recalled" (state S4). Then the regional wholesaler RW disposes the product to the product status set to dispose/terminate (state $\perp$).

The supply chain application (platform) based on FIG. 1-3 may support at least the following protocol functionalities:

PUBLISH_PRODUCT (product_info, state_fsm):
   The manufacturer announces the product information and the predefined life cycle.
PUBLISH_ITEM ($ID_{item}$):
   The manufacturer announces a product item information.
UPDATE_ITEM_STATE ($ID_{item}$, S', P):
   A partner in FIG. 1, the national or regional wholesaler NW, RW or the retailer R wishes to update the state of an item, and also transfers the privilege to (another) partner P for state modification.
QUERY_ITEM ($ID_{item}$):
   A partner wishes to inquire the item information.

In an embodiment the network is built on top of Bitcoin. Nodes in Bitcoin send transactions to the network. The transaction's input includes the hash value of the previous related transaction. The method is described in detail in the following:

For each transaction in Bitcoin, the following formal is used:
Tx: [Input_Tx|Payload|$Pubkey_{receiver}$|$Sig_{sender}$]
According to Bitcoin, the next transaction that is able to provide a signature with the $Pubkey_{receiver}$ from the input transaction represents the account who is able to redeem the coin, and thus the next transaction will be validated according to that.
PUBLISH_PRODUCT (product_info, state_fsm):
The manufacturer M broadcasts the following transaction in the network:
   Tx0: [0|(product_info, state_fsm)|$Pubkey_M$|$Sig_M$]
Additional transaction validation rule 1: when the Input_Tx field is zero, the nodes verify the signature of the manufacturer M, as his public key is known to all partners P.
PUBLISH_ITEM ($ID_{item}$):
The manufacturer M broadcasts the following transaction in the network, announcing X is an item of product from Tx0, and initializing its state to "S0".
   Tx1: [Tx0|(H($ID_x$), S0)|$Pubkey_M$|$Sig_M$]
Additional transaction validation rule 2: when the Input_Tx is PUBLISH_PRODUCT type, the nodes will verify if the state value is the initial state in Tx0.
UPDATE_ITEM_STATE ($ID_{item}$, S', W):
When the manufacturer M ships item X to wholesaler W, he first traverses all the transactions in the blockchain and locates the one includes X's ID. He then broadcasts the following transaction to update the state:
   Tx2: [Tx1|(H($ID_x$), S1)|$Pubkey_W$|$Sig_M$]
Similarly, when the wholesaler W receives item X, he also traverses all the transactions in the blockchain and locates the last validated transaction includes X's ID. He then broadcasts the following transaction to update the state: Tx3: [Tx2|(H(ID$_X$), S2)|Pubkey$_W$'|Sigw]

Additional transaction validation rule 3: the nodes will traverse the transactions until the initial transaction Tx0 in order to get state_fsm, and verify if the state transition S→S' is valid or not.

QUERY_ITEM (ID$_{item}$):

Any partner P is able to verify if the serial number of one item is from a genuine product or not by traversing the blockchain and find all the transactions given the hash value of the ID. Then he can traverse and verify the state transitions and retrieve the latest information.

In a further embodiment the network is built on top of or based on Ethereum. Ethereum is a decentralized platform for applications that run exactly as programmed without any chance of fraud, censorship or third-party interference. Blockchain like Bitcoin uses a per-output transactional model; this means each transaction will point to a previous transaction whose output will be served as the input of the current transaction. Ethereum, however, uses a per-address transaction model, where the transaction refers to the address of node accounts or contract accounts. Here a contract account represents a program with a collection of code (functions) and data (state). Each node running Ethereum client has an EVM (Ethereum Virtual Machine) that is able to execute the code of a contract.

The format of the broadcast messages is defined as follows:

Nodes can broadcast a contract, which will reside at a specific address in the blockchain. It includes the bytecode of a program, the data, and the API list that can be invoked through transactions.

Cntrt (code, data, API)

Nodes can broadcast a transaction, to another contract in order to invoke an API of a certain contract.

Tx (contract_address, api, call_payload)

The new generated block is broadcast into the network as the blockchain has defined.

The contract of a product and a product item for said product may be defined as in Table 1 and Table 2:

TABLE 1

Contract description of a product item

| Type | Attribute/Method Name | Description |
| --- | --- | --- |
| Data | itemIdHash | The hash value of the item ID, which is a unique and unpredictable serial number defined by the manufacture (initialized when the contract is created) |
|  | productContract | The address of the corresponding product contract |
|  | state | The current state of the product (initial state is set when contract is created) |
|  | validModifier | The account address of the partner who is able to modify the current state of the item (initial value set to the creator of the contract) |
| Function | getState( ) | Return the value of data state |
|  | setState(state', addrP) | The sender of the message and the state transition pair state → state' is first evaluated. If the sender is validModifier and the state transition is valid by the product contract, it will update state to s' and save addrP as validModifier. |

TABLE 2

Contract description of a product

| Type | Attribute/Method Name | Description |
| --- | --- | --- |
| Data | product_info | Product information |
|  | product_items | A map of item ID to its corresponding item contract address (itemIdHash →itemContract) |
|  | state_fsm | Finite state machine of the product state. It defines the life cycle of the product, i.e., valid state transition rules. It can be realized by a key-value map of (current_state → [next_valid_states, . . . ]) |
| Function | produce(itemIdHash, address) | Verify if the sender of the transaction is the same as the creator of this contract (i.e., manufacturer). If so, add new key-value pair itemIdHash → address to product_items |
|  | getProductInfo(itemIdHash) | Verify if the item whose ID hash value is in the product_items, if so, return the value of product_info |
|  | getItemContract(itemIdHash) | Verify if the item whose ID hash value is in the product_items, if so, return the contract address stored in product_items |
|  | evaluateStateTransition(s, s') | Evaluate the transition s →s' by checking in state_fsm. Return true if s' is in the list of next valid states of s |

The application protocol then provides the following transactions:

PUBLISH_PRODUCT (product_info, state_fsm):

The manufacturer M publishes a new contract [ProductA] into the network. The contract API implementation is always the same. The manufacturer M just needs to initialize the product contract with different value.

M: Cntrt[ProductA]←Cntrt(code$_P$, [product_info, { }, state_fsm], API$_P$), where state_fsm defined by example in FIG. 3 can be realized using a key-value map: (S0->[S1], S1->[S2], S2->[S1, S3], S3->[S4, ⊥], S4->[⊥]). Finally the manufacturer attains the address of the published contract as Cntrt[ProductA]

PUBLISH_ITEM (ID$_X$):

Whenever a new item X of Product A is manufactured, the manufacturer M will publish a new item contract [ItemX]. Meanwhile he also updates the product information to include item X.

M: Cntrt[ItemX]←Cntrt(code$_1$, [Hash(ID$_X$), S0], API$_I$)

M: Tx(Cntrt[ProductA], produce, [Hash(ID$_X$), Cntrt[ItemX]])

UPDATE_ITEM_STATE (ID$_X$, S1, W):

When the manufacturer M sends a batch of product items to a wholesaler W, the checkout process will register each item X in the batch by its ID and update its state to S1. The protocol is composed of two steps, first get the item contract address by inquiring the product contract, before updating the state to the item.

M: Cntrt[ItemX]←T$_X$(Cntrt[*ProductA*], getItemContract, Hash(ID$_X$)]

M: Tx(Cntrt[ItemX], setState, [S1, Addrw])

Similarly, when the wholesaler W receives the product batch, the check-in process can be done by UPDATE_ITEM_STATE(ID$_Y$, S2, W') as follows, W: Cntrt[ItemY]←Tx(Cntrt[ProductA], getItemContract, Hash(ID$_Y$)]

W: Tx(Cntrt[ItemY], setState, [S2, Addrw'])

Finally, after a retailer R sells the item Z, he will execute UPDATE_ITEM_STATE(ID$_Z$, S3, M), so that the manufacturer can later recall the item or announce it to be disposed or terminated.

R: Cntrt[ItemZ]←Tx(Cntrt[ProductA], getItemContract, Hash(ID$_Z$)]

R: Tx(Cntrt[ItemZ], setState, [S3, Addr$_M$])

QUERY_ITEM (ID$_{item}$):

When a partner would like to request if ID$_{item}$ is a valid serial number of the product A, he will broadcast the transaction as, P: product_info←Tx(Cntrt[ProductA], getProductInfo, ID$_{item}$)

The validation process according to said embodiment is untouched as what the Ethereum blockchain has defined. The embodiments provide the following features:

The manufacture's account address (public key) is registered in the blockchain network (e.g., in genesis block). Therefore the product contract and the item contract are verifiable by all partners P.

The network will verify the transactions, therefore all partners P will reach consensus on the information and state of the product items.

A partner P can always verify if the serial number of an item is valid or not by computing the hash value of the number in question and querying the product contract.

The item serial number has never been sent to the blockchain network. An adversary cannot create a counterfeit with a valid serial number by just observing the communication in the network, as the serial number is unpredictable and its hash value does not reveal any information about the number.

Figure 4:
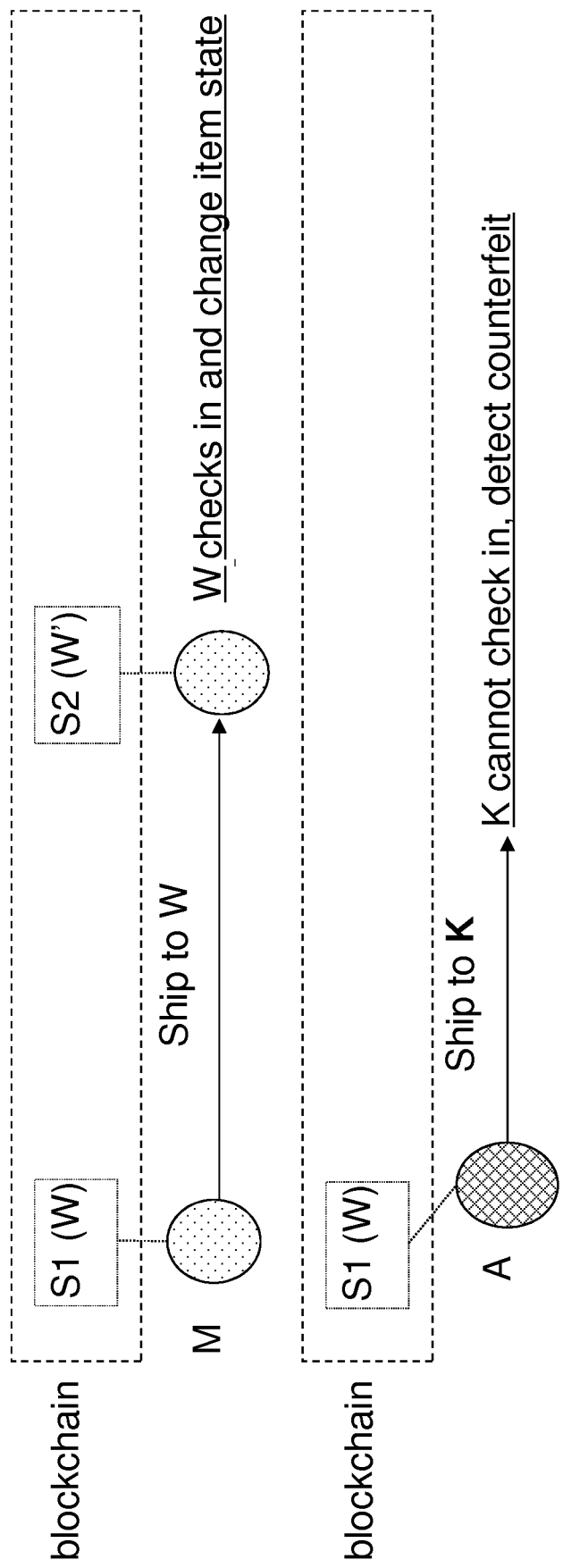
FIG. 4 shows a part of a method according to an embodiment of the present invention.

FIG. 4 shows a part of a method according to a further embodiment of the present invention. In FIG. 4 a detection of counterfeit products when receiving partner is supposed to be the receiver is shown. In FIG. 4 manufacturer M has an item in state S1 with the wholesaler W determined to be able to modify the state change. The manufacturer M ships the item to the wholesaler W which checks the item in and changes the state item into state S2 (receive). In case when a counterfeit product which is manufactured by a fraud manufacturer A and having state S1 is shipped to a wholesaler K cannot check in the item in the blockchain and thus the counterfeit is detected.

Figure 5:
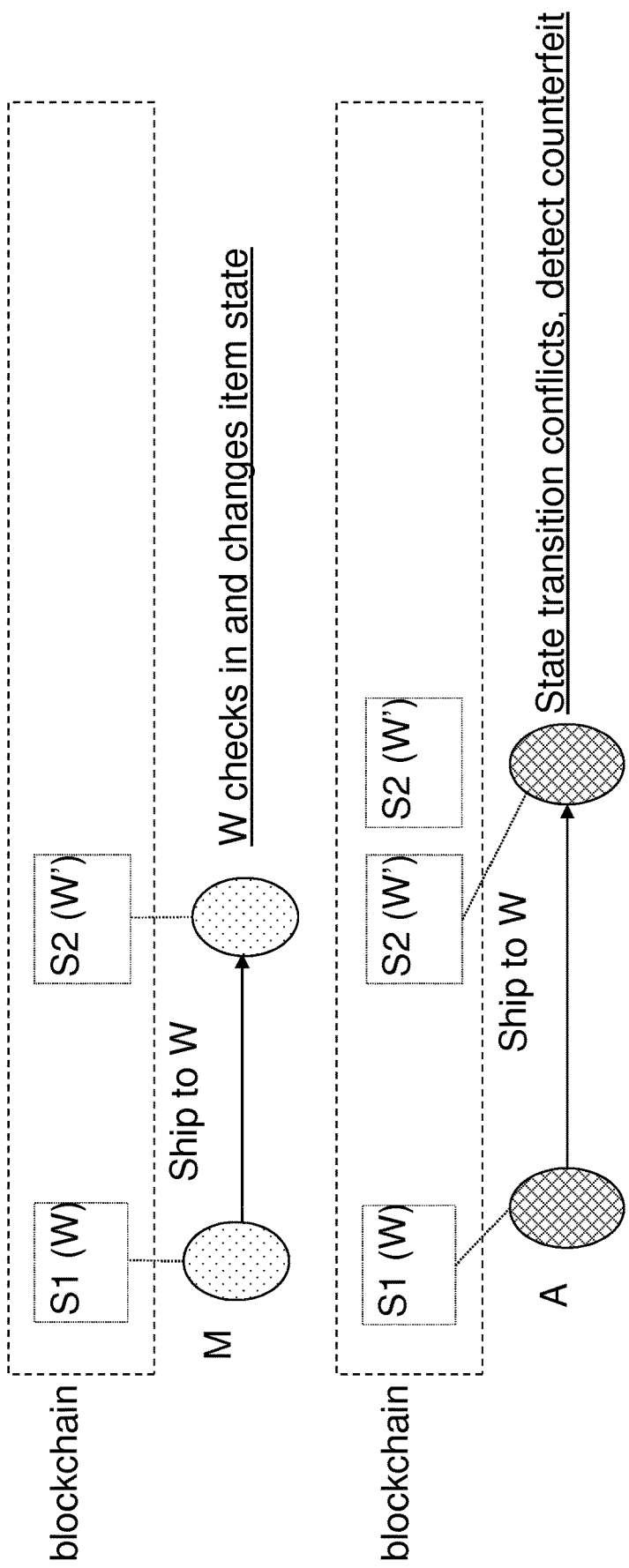
FIG. 5 shows a part of a method according to an embodiment of the present invention.

FIG. 5 shows a detection of counterfeit products when the receiving partner is supposed to be the receiver. In the upper half of FIG. 5 the same procedure as in FIG. 4 in the upper half is shown. In the lower half a fraud manufacturer A has manufactured an item being supposed to be sent to the wholesaler W i.e. if a partner is the next receiver of the genuine item and the counterfeit item, the second check in for the counterfeit item will fail as a state transition conflict occurs since the state of the counterfeit item can not be changed.

When the life cycle of an item comes to an end, it is archived and only the terminated state is left in the blockchain to save the storage cost. When the item's state changes to terminated state, it informs the item contract and remove the item contract from the blockchain so that it can no longer be invoked.

In a further embodiment an identify verification authority, 'IVA', can be used to provide accountability while preserving user privacy as long as the partner does not misbehave:

The blockchain provides its users with anonymity and privacy to a certain extent, as each user can generate as many anonymous accounts as possible. However, in the supply chain application, if a node is misbehaving (e.g., send invalid transactions), no real world identity can be discovered and punished.

This IVA provides identify verification service to partners P. She also accepts requests to acknowledge a new account from the verified partners P and announce it into the blockchain network. The IVA can for example create a contract Cntrt[IVA] to acknowledge the accounts, in which the data is a list of acknowledged accounts, and the function is acknowledge(account) that adds a new account to the list if the sender of transaction is the IVA himself.

Even further the IVA can provide registration of partners P: The partners provide their identity information and their root certificates to the IVA. The IVA verifies the identity and store the root certificate locally.

The IVA can also provide account creation for partners P: A partner P can create a new account (i.e., create a new key pair) at any time. He submits the account to the IVA signed with his registered root key in off-chain channel. IVA verifies the signature and acknowledge the new account in the blockchain by sending a transaction: Tx(Cntrt[IVA], acknowledge, new_account).

To validate a transaction the IVA provides Cntrt[IVA]: When nodes receive a new transaction, they will additionally resort to Cntrt[IVA] to see if the sender account is acknowledged. Otherwise the transaction is not valid and will be discarded.

With the IVA, the partners P are still able to avoid traceability and likability related to their accounts, as they are able to dynamically generate multiple accounts for each usage. However, once a node has detected anomaly behavior, the event will be reported and IVA will reveal the identity of the related account, thus having an impact on the partner's reputation.

Ethereum is using Proof of Stake to achieve consensus in the network. In this consensus protocol, the voting power of each node for a new block is decided by his stake (his account balance). To manipulate the block generation the attacker has to gain 51% of the entire currency supply. But in the supply chain application, it is not practical for partners to deposit money to the application.

In a further embodiment the stake is set as the number of product items that a certain account holds. Each time when partner W is updating the state of an item and changing the validModifier from account W to an account R, W also transfers one virtual coin to account R. Thus account R holds virtual stake which is equivalent to the number of product items it holds at a moment.

Though a partner P can use disposable anonymous accounts to hide who is dealing with a certain number of product items, the product information remains public and therefore, a rival is able to know number of products the manufacturer has produced. In addition, the announcement of each item means that the check-in/checkout process will send at least one transaction per item in the blockchain.

In a further embodiment instead of the item contract a batch contract is used. A batch contract is a batch of items whose ID is defined to be the cryptographic accumulator of the items in the batch:

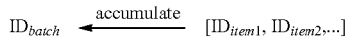

$$ID_{batch} \xleftarrow{accumulate} [ID_{item1}, ID_{item2},...]$$

Therefore, instead of publishing N contracts, the manufacturer only publishes one batch contract using an accumulator that can prove the membership of each of the N accumulated items. Here, one can accumulate using Merkle trees (static accumulators) or using existing state of the art dynamic accumulators.

The number of batch items, batchSize, may be also encrypted, representing the number of items in the batch using homomorphic encryption with the public key of the recipient. The homomorphic encryption of item X is denoted by HEnc(X). This makes the entire stake of each partner or manufacturer encrypted, hence no proof of stake system can be integrated with such encryption. To remedy this, e.g. the recipient proves, in zero-knowledge, his stake. More specifically, the recipient can prove that he has stake greater or equal than some pre-defined threshold stakes. This is performed non-interactive and does not require communication among nodes.

Thus, said embodiment enables to hide the number of products each account (partner) is dealing with, to reduce the number of transactions in the network, and to verify the stake during PoS block validation using zero-knowledge proofs over the encrypted batch size.

The transactions of this embodied are then provided as follows:
PUBLISH_PRODUCT (product_info, state_fsm):
Same as before/above.
PUBLISH_BATCH (ID$_{batch}$, HEnc(N),):
The manufacturer announces a batch of items.
M: Cntrt[BatchX]←Cntrt(code$_1$, [ID$_X$, HEnc(N), S0], API$_1$)
M: Tx(Cntrt[ProductA], produce, [ID$_X$, Cntrt[BatchX]])
UPDATE_ITEM_STATE (ID$_{batch}$, S', P):

When a partner W ships a batch X to another partner R, W will compute the batch ID accumulated from all the product items' ID.
W: Cntrt[BatchX]←Tx(Cntrt[*ProductA*], getBatchContract, ID$_X$]
W: T$_X$(Cntrt[BatchX], setState, [S1, Addr$_R$])
If batch X is not originally created by the manufacturer M, but rather a sub-batch of Y recorded in Product A, then W can send multiple transactions to batch contract Y in order to include sub-batch X, by providing the membership proofs of all items in X (number of proofs is less or equal to X's batch size) against the accumulator of Y. If the accumulator is using the Merkle tree approach and the batch of items are arranged in such a way that membership proofs can be provided for sub-tree root node too, then the membership proof of items X is just the accumulator of X. It is the same for the retailer when he sells an item K. The item is registered to the batch by providing the membership.
Meanwhile, the stake of each account is a homomorphic encryption of the number of items. The state update of batch contract X will transfer the stake batchSize to account R, where the sum is calculated by homomorphic encryption addition.
QUERY_ITEM (ID$_{item}$):
For a wholesaler, he is able to verify the information of a whole batch of product items.
For a customer, the information of item K is acquired similar to the other embodiments as the item is checked out by the retailer.
For the consensus protocol to work with Proof of Stake, validation nodes (validators) bond their stakes in order to finalize a new block. Nodes only consider a block as finalized if it has the participation of a supermajority of validators (or bonded stake). Since the stake is now encrypted in the amendment, the validators need to provide a zero-knowledge proof during the bonding process, that their stake is within the range of [n, m], where m can be set to a fixed upper-bound value. The validation process can then verify if the sum of the stakes from all validators is sufficient.
In some supply chains such as car manufacturers, multiple items are composed to generate a new product item. An amendment of the contract may than be published to point the components to the newly generated item.
In an even further embodiment the present inventions provides a method for managing product items in our blockchain-based supply chain platform, comprising the steps of
1) PUBLISH_PRODUCT (product_info, state_fsm):
The manufacturer publishes a new contract [ProductA] into the network.
M: Cntrt[ProductA]<-Cntrt(codeP, [product_info, { }, state_fsm], APIP)
2) PUBLISH_ITEM (IDitem):
Whenever a new item X of Product A is manufactured, the manufacturer will publish a new item contract [ItemX]. Meanwhile he also updates the product information to include item X.
M: Cntrt[ItemX]<-Cntrt(codeI, [Hash(IDX), S0], API])
M: Tx(Cntrt[ProductA], produce, [Hash(IDX), Cntrt[ItemX]])
3) UPDATE_ITEM_STATE (IDitem, S', P):
A partner wishes to update the state of an item X, also transfer the privilege to (another) partner P for state modification.

M: Cntrt[ItemX]<-Tx(Cntrt[ProductA], getItemContract, Hash(IDX))]
M: Tx(Cntrt[ItemX], setState, [S', AddrP])
4) QUERY_ITEM (IDitem):
When a partner would like to request if IDitem is a valid serial number of the product A, he will broadcast the transaction as,
P: product_info<-Tx(Cntrt[ProductA], getProductInfo, IDitem)

In summary, at least one embodiment of the present invention enables or provides at least one of:
Encoding access polices and state transition rules in a contract so that a state update operation can be verified by all nodes, thus making counterfeiting detection convenient.
the number of products held by each partner as stake for blockchain consensus protocol based on Proof of Stake.
an encrypting of the number of products held by each partner to provide user privacy and using zero-knowledge proof to allow validation check in Proof of Stake.
Publishing contracts/transactions of a batch of product items instead of individual contracts/transactions for each item, thus improving scalability of the system.
accumulators in the batch contract to provide the membership proof of an item or a sub-batch that can be traced back to the original batch published by the manufacturer.
an archiving of products that are out of the life cycle by only keeping of the last state of the product, which enables storage savings.
inclusion of an accountability mechanism revealing identities of the misbehaving partners, but preserving user anonymity during normal transactions.

At least one embodiment of the present invention may have at least one of the following advantages:
inherent detection of counterfeiting in a blockchain,
scalability,
no requirement to trust a single partner,
misbehavior in the supply chain management can be detected elaborating distributed consensus based on Proof of Stake,
enhanced privacy since their stake is effectively hidden by using accumulators and cryptographic primitives.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for managing a database collectively maintained by in a network of nodes, wherein the network is a decentralized blockchain consensus network, and wherein the nodes of the network are interrelated with each other according to a tree-like structure, the method comprising:
sending, by a root node to the decentralized blockchain consensus network as a transaction to be verified by the decentralized blockchain consensus network, a product contract for a new product, the product contract being a data structure having encoded therein:
product information,
a map of respective product items that represent instances of the new product, and
state transition rules that define validity of updates to item state information included in respective product item contracts for the respective product items that represent respective instances of the new product,
sending, by the root node to the decentralized blockchain consensus network as a transaction to be verified by the decentralized blockchain consensus network, a new product item contract for a new product item that represents a new instance of the new product, the new product item contract being a data structure having encoded therein:
item identification information,
item state information, and
modifier information defining an identity of at least one node able to perform a valid modification of the item state information; and
updating, by the root node upon sending the new product item contract as a transaction to be verified by the decentralized blockchain consensus network, the map of respective product items to include the new product item,
wherein the nodes of the decentralized blockchain consensus network are configured to verify, upon receipt of a proposed transaction proposing an update to the item state information of the new product item contract, that the proposed update is valid in accordance with the state transition rules of the product contract, and
wherein upon verification of the proposed transaction, the verified transaction is added to the blockchain with an address of the root node.

2. The method according to claim 1, wherein the address of the root node is a public key of the root node.

3. The method according to claim 1, wherein the item identification information is based on a unique, unpredictable number, chosen upon creation of the new product item contract.

4. The method according to claim 1, wherein the item identification information is a hash value of a serial number of the new product item.

5. The method according to claim 4, wherein the valid state transition rules are provided as a finite state machine of that defines a lifecycle of the new product, and wherein the finite state machine is embedded in the blockchain.

6. The method according to claim 5, wherein the state transition rules are provided as a key-value-map indicating respective states as keys and one or more respective subsequent valid states to which the respective state can be changed as values for the key.

7. The method according to claim 5, wherein the map of respective product items that represent instances of the new product map hash values of respective serial numbers of respective product items to respective product item contracts that correspond to the respective product items.

8. The method according to claim 1, wherein to validate a proposed transaction involving a respective product item, a respective node broadcasts a-the proposed transaction in the network, the proposed transaction including product item identification information corresponding to the respective product item and the product contract corresponding to the respective product item, and wherein the nodes of the decentralized blockchain consensus network are configured to verify the proposed transaction by computing the product item identification information and querying the product contract.

9. The method according to claim 1, wherein the state transition rules define, as valid item state information, a terminated state, and wherein when the item state information of a respective product item contract is updated to the terminated state, the respective product item contract is removed from the blockchain.

10. The method according to claim 1, wherein a central verification authority provides verification for the nodes upon request and registers and verifies users of the nodes.

11. The method according to claim 1, wherein consensus within the network is achieved using a Proof-of-Stake, wherein a stake of a respective node is defined as a number of product items associated with a certain account corresponding to the respective node.

12. The method according to claim 11, wherein for providing the Proof-of-Stake blocks in the blockchain are bonded for finalization, wherein the finalization is based on a supermajority of validating nodes, wherein for bonding a zero-knowledge proof by the validating nodes is computed such that their stakes are within a certain range.

13. The method according to claim 1, wherein a product item contract accumulates cryptographically a plurality of product items.

14. The method according to claim 13, wherein a number of cryptographically accumulated product items is encrypted using homomorphic encryption and an encryption key is the public key of a receiving node.

15. A decentralized blockchain consensus network comprising:
a plurality of nodes, the plurality of nodes being interrelated with each other according to a tree-like structure, and the plurality of nodes including a root node, wherein the root node is configured to:
send, to the decentralized blockchain consensus network as a transaction to be verified by the decentralized blockchain consensus network, a product contract for a new product, the product contract being a data structure having encoded therein:
product information,
a map of respective product items that represent instances of the new product, and
state transition rules that define validity of updates to item state information included in respective product item contracts for the respective product items that represent respective instances of the new product;
send, to the decentralized blockchain consensus network as a transaction to be verified by the decentralized blockchain consensus network, a new product item contract for a new product item that represents a new instance of the new product, the new product item contract being a data structure having encoded therein:
item identification information,
item state information, and
modifier information defining an identity of at least one node able to perform a valid modification of the item state information; and
update, upon the sending the new product item contract as a transaction to be verified by the decentralized blockchain consensus network, the map of respective product items to include the new product item,
wherein the nodes of the decentralized blockchain consensus network are configured to verify, upon receipt of a proposed transaction proposing an update to the item state information of the new product item contract, that the proposed update is valid in accordance with the state transition rules of the product contract, and
wherein, upon verification of the proposed transaction, the verified transaction is added to the blockchain with an address of the root node.

16. A non-transitory computer readable medium storing a program which, when executed, causes a computer to execute a method for managing a database collectively maintained by a network of nodes, wherein the network is a decentralized blockchain consensus network, wherein the nodes of the network are interrelated with each other according to a tree-like structure, the method comprising:
sending, by a root node to the decentralized blockchain consensus network as a transaction to be verified by the decentralized blockchain consensus network, a product contract for a new product, the product contract being a data structure having encoded therein:
product information,
a map of respective product items that represent instances of the new product, and
state transition rules that define validity of updates to item state information included in respective product item contracts for the respective product items that represent respective instances of the new product,
sending, by the root node to the decentralized blockchain consensus network as a transaction to be verified by the decentralized blockchain consensus network, a new product item contract for a new product item that represents a new instance of the new, the new product item contract being a data structure having encoded therein:
item identification information,
item state information, and
modifier information defining an identity of at least one node able to perform a valid modification of the item state information; and
updating, by the root node upon sending the new product item contract as a transaction to be verified by the decentralized blockchain consensus network, the map of respective product items to include the new product item,
wherein the nodes of the decentralized blockchain consensus network are configured to verify, upon receipt of a proposed transaction proposing an update to the item state information of the new product item contract, that the proposed update is valid in accordance with the state transition rules of the product contract, and
wherein upon verification of the proposed transaction, the verified transaction is added to the blockchain with i4s-an address of the root node.

* * * * *